(12) United States Patent
Yoo (10) Patent No.: US 10,742,741 B2
(45) Date of Patent: Aug. 11, 2020

(54) METHOD AND APPARATUS FOR CONTROLLING IOT DEVICES INTERLOCKED WITH VEHICLE

(71) Applicants: Hyundai Motor Company, Seoul (KR); Kia Motors Corporation, Seoul (KR)

(72) Inventor: Ha Na Yoo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/178,347

(22) Filed: Nov. 1, 2018

(65) Prior Publication Data
US 2019/0141132 A1    May 9, 2019

(30) Foreign Application Priority Data
Nov. 3, 2017 (KR) ........................ 10-2017-0146004

(51) Int. Cl.
| | |
|---|---|
| *H04L 29/06* | (2006.01) |
| *H04W 4/70* | (2018.01) |
| *H04L 29/08* | (2006.01) |
| *H04B 1/3827* | (2015.01) |
| *H04B 1/00* | (2006.01) |
| *G06F 1/16* | (2006.01) |

(52) U.S. Cl.
CPC ............ *H04L 67/12* (2013.01); *H04B 1/006* (2013.01); *H04B 1/385* (2013.01); *H04L 65/60* (2013.01); *H04L 67/38* (2013.01); *H04W 4/70* (2018.02); *G06F 1/163* (2013.01)

(58) Field of Classification Search
None
See application file for complete search history.

(56) References Cited

U.S. PATENT DOCUMENTS

| | | | |
|---|---|---|---|
| 9,692,611 B1* | 6/2017 | Tom | H04L 67/12 |
| 2015/0134727 A1 | 5/2015 | Lee et al. | |
| 2015/0347114 A1 | 12/2015 | Yoon | |
| 2017/0289253 A1* | 10/2017 | Graefe | H04L 67/10 |
| 2018/0205783 A1* | 7/2018 | Pogorelik | H04L 67/06 |
| 2018/0232643 A1* | 8/2018 | Ekambaram | G06N 20/00 |

FOREIGN PATENT DOCUMENTS

| | | |
|---|---|---|
| KR | 10-1678606 B1 | 11/2016 |
| KR | 10-2017-0063202 A | 6/2017 |
| KR | 10-2017-0089119 A | 8/2017 |
| WO | WO 2015/103154 A1 | 7/2015 |

* cited by examiner

*Primary Examiner* — Joshua Joo
(74) *Attorney, Agent, or Firm* — Morgan, Lewis & Bockius LLP (57) ABSTRACT

A method and an apparatus for controlling Internet-of-Things (IoT) devices interlocked with a vehicle are disclosed may include confirming first classification information related to a plurality of IoT devices, confirming second classification information related to at least one service to be provided using the plurality of IoT devices, determining reliability of the plurality of IoT devices corresponding to the first classification information and the second classification information, in the case in which data of the same item are transmitted redundantly from the plurality of IoT devices, selecting a value transmitted from an IoT device selected corresponding to the reliability, and transmitting the selected value to a device that performs the at least one service.

18 Claims, 4 Drawing Sheets

METHOD AND APPARATUS FOR CONTROLLING IOT DEVICES INTERLOCKED WITH VEHICLE

The present application claims priority to Korean Patent Application No. 10-2017-0146004, filed on Nov. 3, 2017, the entire contents of which is incorporated herein for all purposes by this reference.

BACKGROUND OF THE INVENTION

Field of the Invention

The present invention relates to a method and an apparatus for controlling IoT devices interlocked with a vehicle, and more particularly, to an apparatus and a method capable of improving the quality of a service to be provided to a user by collecting or transmitting data exchanged with a plurality of IoT devices interlocked with a vehicle in connection with which the service is provided.

Description of Related Art

The combination of vehicles and the Internet-of-Things (IoT) enables various services to be provided to a driver or a passenger of a vehicle. Here, "IoT" refers to a network of things and space falling into three environmental categories: human beings, things, and services, that mutually generate therebetween logical relationships pertaining to, for example, detecting, networking, information processing, etc. without explicit human intervention. The "Things" that form the IoT include not only home appliances in a wired/wireless network but also physical things, such as human beings, vehicles, bridges, various electronic devices, cultural assets and the natural environment. The definition of IoT is evolving into a concept of interaction not only with things but also with all information in the real and virtual worlds.

The development of IoT technology has enabled various devices to access the internet, and a plurality of IoT devices is also provided in homes and certain spaces. To provide diverse services using IoT devices provided in homes and certain spaces, it is necessary to transmit or store data generated by these devices. Thus, an IoT server is used as a network device to perform data communication with IoT devices (i.e. things) and to exchange necessary data therewith.

Data transmitted from multiple IoT devices that are disposed in or interlocked with a vehicle are processed by a processing system in the vehicle or by a network system connected to the vehicle, providing services demanded by a driver or a passenger. For example, the services demanded by a driver or a passenger may include extensive services concerned with driving, health, information, etc. Information or data regarding the services demanded by a driver or a passenger may be collected from multiple IoT devices.

Information or data that a vehicle can collect may be received redundantly from multiple IoT devices. Furthermore, there may be variation in data due to error, malfunction or difference in reliability between the multiple IoT devices that collect information or data. In the instant case, the quality of services provided through the vehicle may be lowered.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and an apparatus configured for controlling IoT devices interlocked with a vehicle that substantially obviate one or more problems due to limitations and disadvantages of the related art.

Various aspects of the present invention are directed to providing a method and an apparatus configured for recognizing the characteristics of a plurality of IoT devices, with which an audio-video-navigation (AVN) device, disposed in a vehicle which may be interlocked with IoT devices, is interlocked, and the characteristics of a service demanded by a user or a passenger, selectively collecting and providing highly reliable data for provision of the service.

Various aspects of the present invention are directed to providing a method and an apparatus facilitating an electronic device configured for a vehicle, which is interlocked with a plurality of IoT devices, to select data, preventing redundant transmission of data and thus efficiently controlling the amount of wireless data communication necessary to provide various services using the IoT devices.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure pointed out in the written description and claims hereof as well as the appended drawings.

To achieve these objects and other advantages and in accordance for an exemplary embodiment of the present invention, as embodied and broadly described herein, a method of controlling a multimedia device configured for a vehicle includes confirming first classification information related to a plurality of Internet-of-Things (IoT) devices, confirming second classification information related to at least one service to be provided using the plurality of IoT devices, determining the reliability of the plurality of IoT devices corresponding to the first classification information and the second classification information, in the case in which data of the same item are transmitted redundantly from the plurality of IoT devices, selecting a value transmitted from the IoT device selected corresponding to the reliability, and transmitting the selected value to a device that performs the at least one service.

The plurality of IoT devices may include a wearable device, and the first classification information may include a wearing position, a wearing type, a product type, and a frequency of use.

The wearable device may output biometric information related to a driver or a passenger in a vehicle, and the at least one service may be related to health or driving safety of the driver or the passenger in the vehicle.

The plurality of IoT devices may include a portable terminal, the portable terminal may output location information, and the at least one service may be performed to provide predetermined information to the driver or the passenger in the vehicle based on the location information.

The second classification information may correspond to the kind of data that are required for performance of the at least one service.

The second classification information may be classified according to any one of biometric information, location information, and traveling state information related to the vehicle.

The selecting the value transmitted from the IoT device selected corresponding to the reliability may include detecting at least one item of data demanded by the at least one service, primarily matching information collected from a first IoT device configured for the at least one item, the first IoT device being the most reliable, and in the case in which data that are matched for the item are absent, secondarily matching information collected from a second IoT device configured for the item, the second IoT device being the second-most reliable, next to the first IoT device. The secondarily matching may be repeated until all of the data are collected.

The selecting the value transmitted from the IoT device selected corresponding to the reliability may include determining whether there is an error in information collected from a first IoT device, the first IoT device being the most reliable among the plurality of IoT devices, comparing similarity between the information collected from the first IoT device and information collected from remaining IoT devices, among the plurality of IoT devices, and adjusting the reliability corresponding to the presence or absence of the error and the similarity.

The presence or absence of the error may be determined based on whether the information exceeds a predetermined critical range.

The method may further include performing connection with the plurality of IoT devices through a wired/wireless network and receiving a request for the at least one service.

The wired/wireless network may support a connection method using at least one of wired communication through a USB cable or wireless near-field communication including Bluetooth, ZigBee and Wi-Fi.

In another aspect of the present invention, an application program is recorded in a computer-readable recording medium to perform the above-described method of controlling a multimedia device configured for a vehicle by being executed by a processor.

In a further aspect of the present invention, a computer-readable recording medium may include an application program that performs the above-described method of controlling a multimedia device configured for a vehicle by being executed by a processor.

In yet a further aspect of the present invention, a multimedia device configured for a vehicle includes a confirmation unit for confirming first classification information related to a plurality of Internet-of-Things (IoT) devices and second classification information related to at least one service to be provided using the plurality of IoT devices, a determination unit for determining the reliability of the plurality of IoT devices corresponding to the first classification information and the second classification information, and a selection unit for selecting a value transmitted from the IoT device which is selected corresponding to the reliability when data of the same item are transmitted redundantly from the plurality of IoT devices.

The confirmation unit may be interlocked with a wearable device as one of the plurality of IoT devices, and the first classification information may include a wearing position, a wearing type, a product type, and a frequency of use.

The confirmation unit may receive biometric information related to a driver or a passenger in a vehicle from the wearable device, and the at least one service may be related to health or driving safety of the driver or the passenger in the vehicle.

The confirmation unit may be interlocked with a portable terminal as one of the plurality of IoT devices, and may receive location information from the portable terminal. The at least one service may be performed to provide predetermined information to the driver or the passenger in the vehicle based on the location information.

The second classification information may correspond to the kind of data that are required for performance of the at least one service.

The second classification information may be classified according to any one of biometric information, location information, and traveling state information related to the vehicle.

The selection device may perform detecting at least one item of data demanded by the at least one service, primarily matching information collected from a first IoT device configured for the at least one item, the first IoT device being the most reliable, and in the case in which data that are matched for the item are absent, secondarily matching information collected from a second IoT device configured for the item, the second IoT device being the second-most reliable, next to the first IoT device. The secondarily matching may be repeated until all of the data are collected.

The selection unit may perform determining whether there is an error in information collected from a first IoT device, the first IoT device being the most reliable among the plurality of IoT devices, comparing similarity between the information collected from the first IoT device and information collected from remaining IoT devices, among the plurality of IoT devices, and adjusting the reliability corresponding to the presence or absence of the error and the similarity.

The presence or absence of the error may be determined based on whether the information exceeds a predetermined critical range.

The multimedia device configured for a vehicle may further include an interface for receiving a request for the at least one service or displaying a result thereon.

The multimedia device configured for a vehicle may further include at least one of a service start unit for performing the at least one service using a selected value or a transmission/reception unit for transmitting the selected value to a device performing the at least one service and for receiving a result related thereto.

The multimedia device configured for a vehicle may be connected to the plurality of IoT devices through a wired/wireless network, and the wired/wireless network may support a connection method using at least one of wired communication through a USB cable or wireless near-field communication including Bluetooth, ZigBee and Wi-Fi.

The confirmation unit, the determination unit and the selection unit may be implemented as a processing system including at least one processor and at least one memory.

The processing system may further perform at least one of an audio function, a video function or a navigation function.

It is to be understood that both the foregoing general description and the following detailed description of the present invention are exemplary and explanatory and are intended to provide further explanation of the present invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, devices and methods to which embodiments of the present invention are applied will be described in detail with reference to the accompanying drawings. The suffixes "module" and "unit" used to describe a configuration component hereinafter are assigned or used together in consideration only of convenience in creating the present specification, and the two suffixes themselves do not have any distinguished meanings or roles from each other.

It will be understood that when an element is referred to as being "on" or "under" another element, it may be directly on/under the element, or one or more intervening elements may also be present. When an element is referred to as being "on" or "under", "under the element" as well as "on the element" may be included based on the element.

Figure 1:
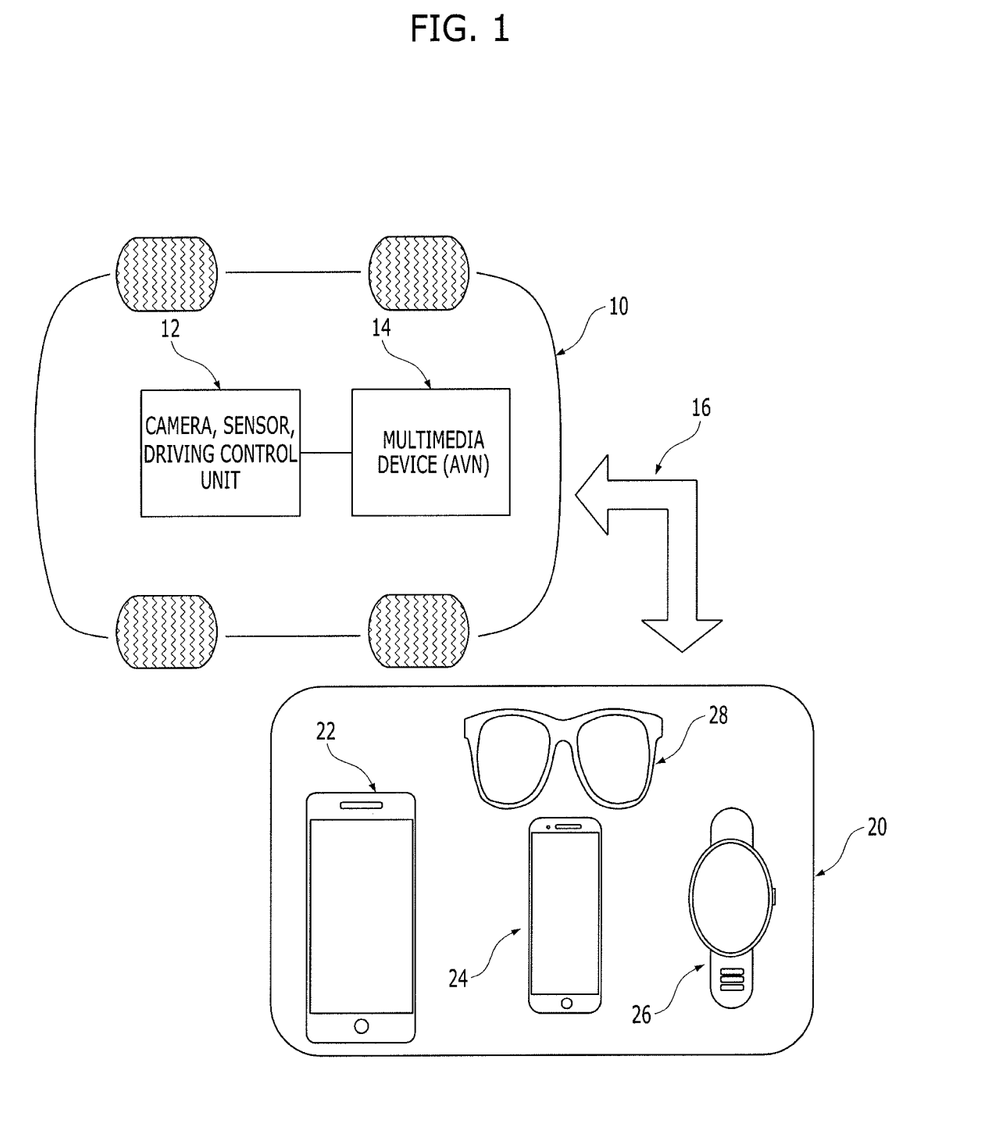
FIG. 1 is a view showing the interconnections between a vehicle and IoT devices.

FIG. 1 is a view showing the interconnections between a vehicle and Internet-of-Things (IoT) devices.

As illustrated, a plurality of devices 12 for traveling and safety of a vehicle 10, such as, for example, a camera, a sensor, a driving control unit, etc., is disposed or included in the vehicle 10. These devices 12 disposed in the vehicle 10 may collect various information, including location information, information on the vicinity thereof, etc., during traveling of the vehicle.

A multimedia device 14 for providing convenience to a driver or a passenger in the vehicle 10 may be included in the vehicle 10. For example, the multimedia device 14 may be disposed in the vehicle, and is configured as an audio device, a video device, and a navigation device.

As IoT devices become popular, a plurality of IoT devices 20, which may be interlocked with the vehicle 10, may be used by a driver or a user. Referring to FIG. 1, the IoT devices 20 may include a tablet 22, a portable terminal 24 such as a smartphone, smart glasses 28, a smart watch 26, etc. Although not illustrated, depending on the embodiment, a wearable device such as a smart band may be included in the IoT devices 20. Furthermore, even though not carried by a driver or a user, devices configured for exchanging information collected through a wired/wireless network may be used as the IoT devices 20.

The multimedia device 14 in the vehicle 10 may collect information from the IoT devices 20, which may be connected thereto through a wired/wireless network. As the kind and the number of IoT devices 20 increase, the case may easily occur where a plurality of IoT devices that transmit similar information are interlocked with or connected to the multimedia device 14 in the vehicle 10 together. For example, a smart band worn by a driver, a passenger or a user may collect and transmit information related to the wearer's activity pattern, such as calorie consumption, the number of steps, a moving distance, a heart rate, etc. Furthermore, smart home appliances which may be connected to the multimedia device 14 in the vehicle 10 through a mobile communication network or a near-field communication network may collect and transmit information related to the user's life pattern, such as a sleeping time, preferred temperature setting, etc. Furthermore, smart glasses worn by a driver, a passenger or a user may also collect and transmit information related to the user's activity pattern, such as the number of steps, a moving distance, eyesight, eye fatigue, etc. Furthermore, a health-related product or a hospital system may collect and transmit information related to the user's health pattern, such as medication history, disease history, etc.

Among the above-described various IoT devices 20, smart glasses, a smart band, a portable terminal, a smart watch, etc., which are wearable devices worn by a person, may individually collect the number of steps, a moving distance, etc. of the user, and may individually transmit the same to the multimedia device 14 in the vehicle. For example, even though a user carries smart glasses, a smart band, a portable terminal and a smart watch at the same time, all of the numbers of steps of the user, collected by the respective devices, may be different from each other. In the present circumstance, in the case in which there is a service which is performed based on the information collected from the plurality of IoT devices 20 (information related to the same item, e.g., the number of steps of the user) and is provided to the user, the multimedia device 14 in the vehicle needs to use or transmit the most reliable information among the information collected from the plurality of IoT devices 20.

In the case in which the multimedia device 14 in the vehicle is connected to a plurality of IoT devices 20, the exemplary embodiment may provide a method of determining the characteristics of the respective devices, confirming the characteristics of the services to be provided to a user, and collecting, transmitting and using the most reliable information among the information collected from the plurality of IoT devices 20 according to the characteristics of the services to be provided to a user.

To the present end, the multimedia device 14 in the vehicle may have information related to the characteristics and properties of the IoT devices 20 connected thereto, and the IoT devices 20 may transmit information related to their inherent characteristics and properties to the multimedia device 14 in the vehicle. This exchange of information may be defined in advance through a protocol for connection between devices through a wired/wireless network for IoT services. For example, in the case in which the multimedia device 14 in the vehicle is connected to the smart watch 26, the multimedia device 14 in the vehicle may recognize classification information, such as the product type, the wearing type, the wearing portion, the purpose of use, the function, etc. of the smart watch 26. Depending on the embodiment, when connected to the multimedia device 14 in the vehicle, the smart watch 26 may transmit the above classification information to the multimedia device 14 in the vehicle. Alternatively, the multimedia device 14 in the vehicle may receive an identifier, such as the serial number of the smart watch 26, may transmit the identifier to a network server, and may receive classification information from the network server.

Figure 2:
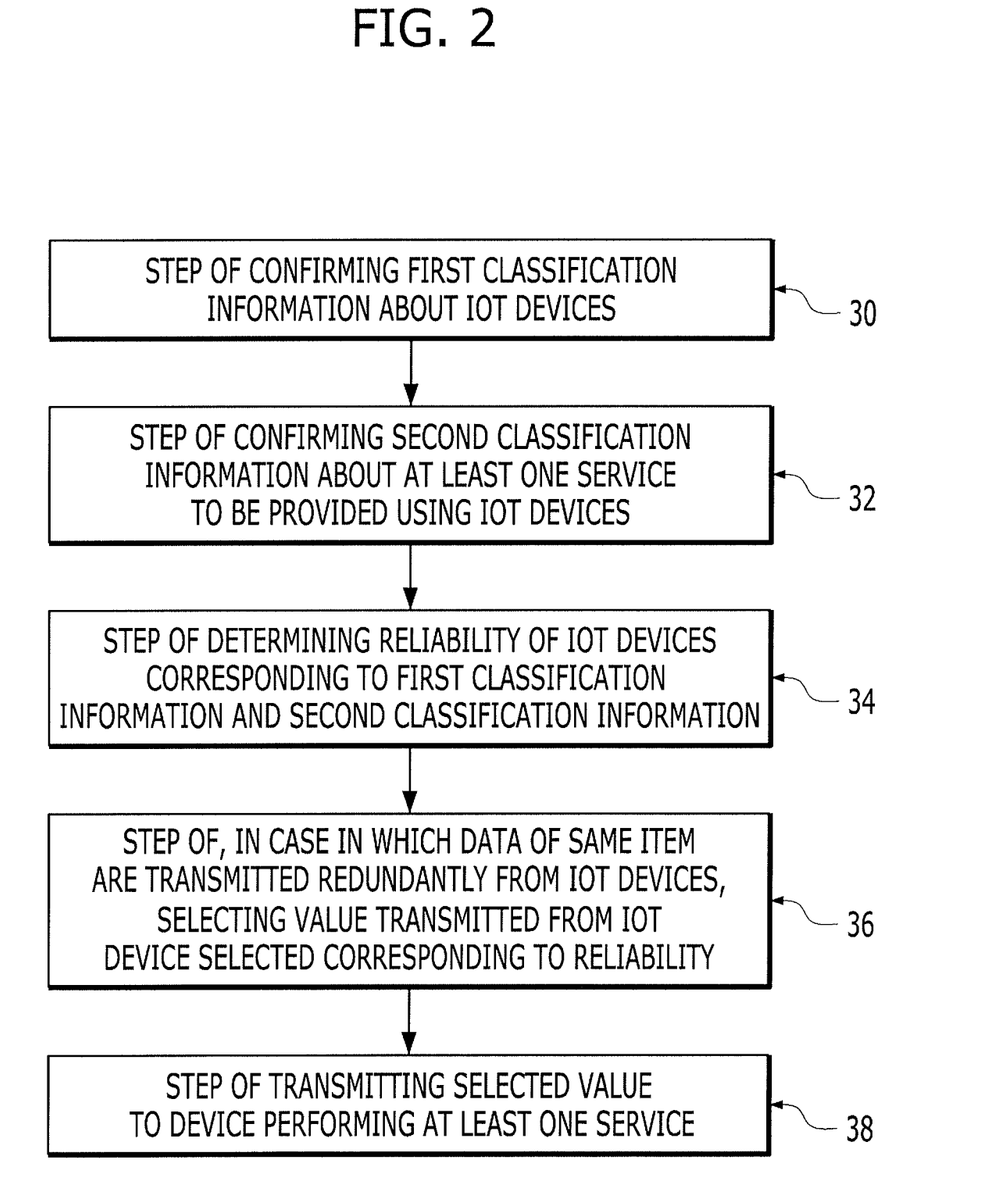
FIG. 2 is a view showing a first example of a method of controlling a multimedia device configured for a vehicle.

FIG. 2 is a view showing a first example of a method of controlling a multimedia device configured for a vehicle.

As illustrated, the method of controlling a multimedia device configured for a vehicle may include a step of confirming first classification information related to a plurality of IoT devices at step 30, a step of confirming second classification information related to at least one service which may be provided using the IoT devices at step 32, a step of determining the reliability of the IoT devices corresponding to the first classification information and the second classification information at step 34, a step of, in the case in which data of the same item are transmitted redundantly from the IoT devices, selecting a value transmitted from the IoT device selected corresponding to the reliability at step 36, and a step of transmitting the selected value to a device that performs at least one service at step 38.

Depending on the embodiment, a plurality of IoT devices, which are interlocked with a multimedia device configured for a vehicle, may include a wearable device. In the case of a wearable device, the first classification information may include a wearing position, a wearing type, a product type, and a frequency of use. For example, in the case of a smart watch, the wearing position may be a wrist, and in the case of smart glasses, the wearing position may be a face. Such a wearable device may output biometric information related to a driver or a passenger in the vehicle, and at least one service which may be performed based on the present information may be related to the health or driving safety of the driver or the passenger in the vehicle. For example, in the case in which a service is performed in a vehicle which is traveling to advise the driver to take a rest using biometric information related to the driver, information related to the driver's body temperature may be required for the present service. In the case in which both the smart glasses and the smart watch can collect information related to the user's body temperature, the multimedia device configured for a vehicle may determine which one of the smart glasses and the smart watch can collect more accurate body temperature information.

Depending on the embodiment, a plurality of IoT devices, which are interlocked with a multimedia device configured for a vehicle, may include a portable terminal. For example, the portable terminal may output location information, and the multimedia device configured for a vehicle may collect location information from the portable terminal. The multimedia device configured for a vehicle may also collect location information through a Global Positioning System (GPS) device disposed in the vehicle. In the case in which at least one service provided to a user based on location information is provision of user's preferred information or information related to interest corresponding to the current location of the user, the multimedia device configured for a vehicle may determine which one of the GPS device and the portable terminal can collect more accurate location information.

The multimedia device configured for a vehicle may recognize second classification information related to at least one service which may be provided using a plurality of IoT devices. Here, the second classification information may correspond to the kind of data that are required for the performance of at least one service. For example, the second classification information may be classified according to biometric information related to the user, location information related to the user, traveling state information related to the vehicle, etc.

The second classification information may be determined according to the kind of services that are provided using a plurality of IoT devices. The services provided to a user may include control of devices connected through a network, provision of information demanded by the user, provision of entertainment to the user, support of autonomous traveling of the vehicle occupied by the user, etc. Depending on the kind of services, as described above, devices that are operated according to services as well as information required for services may vary. Depending on the embodiment, the second classification information may be determined by the kind of devices that are operated as well as the kind of data that are used.

Although not illustrated, the step of selecting a value transmitted from the IoT device selected corresponding to the reliability (36) may include a step of detecting at least one item of the data demanded by at least one service, a first step of matching information collected from a first IoT device having the highest reliability for the at least one item, and a second step of, in the case in which data that are matched for the item are absent, matching information collected from a second IoT device having the second-highest reliability, following the first IoT device, for the corresponding item. Here, the second step may be repeated until all data are collected. In the case in which the service which is provided using a plurality of IoT devices requests a simple piece of information, information collected from the most reliable device may be transmitted. On the other hand, in the case in which the service requests a large amount of various information, the multimedia device configured for a vehicle may receive data from a plurality of IoT devices, and may store information requested by the service in order of reliability of the devices.

Although not illustrated, the step of selecting a value transmitted from the IoT device selected corresponding to the reliability (36) may include a step of determining whether there is an error in the information collected from the first IoT device, which has the highest reliability among the plurality of IoT devices, a step of comparing the similarity between the information collected from the first IoT device and the information collected from the other IoT devices among the plurality of IoT devices, and a step of adjusting the reliability corresponding to the presence or absence of error and the similarity.

The multimedia device configured for a vehicle may determine the presence or absence of error based on the range of values indicated by the information and the data transmitted from a plurality of IoT devices, rather than unconditionally trusting the information and the data. For example, in the case in which the user's heart rate transmitted from a smart band does not fall within the range (the critical range) of a person's heart rate, it is determined that the corresponding information is erroneous. Even though the reliability of the smart band is high, in the case in which information transmitted therefrom is erroneous, it is not necessary for the multimedia device configured for a vehicle to use or transmit the erroneous heart rate information for a service.

Furthermore, in the case in which specific information, e.g., information related to the user's heart rate, is transmitted from a smart band, an activity tracker and a smart watch, the multimedia device configured for a vehicle may compare the heart rate transmitted from the smart band, which has the highest reliability, with the heart rates transmitted from the other two devices, namely the activity tracker and the smart watch. When the difference between the heart rate transmitted from the smart band and the heart rates transmitted from the other two devices exceeds a predetermined range, even though the reliability of the smart band is high, it may be estimated that the heart rate transmitted from the smart band is erroneous. In the case in which the multimedia device configured for a vehicle estimates that information transmitted from a specific IoT device is erroneous, it is not necessary for the multimedia device configured for a vehicle to use or transmit the corresponding information for a service.

As described above, in the case in which the multimedia device configured for a vehicle determines that the received data and information are erroneous, the multimedia device configured for a vehicle may adjust the reliability of the IoT devices. Alternatively, without adjusting the reliability of the IoT devices, the multimedia device configured for a vehicle may use or transmit data and information transmitted from the second-most reliable IoT device, rather than from the most reliable IoT device, for a service.

Although not illustrated, the method of controlling the multimedia device configured for a vehicle may further include a step of connecting the multimedia device configured for a vehicle with a plurality of IoT devices through a wired/wireless network, and a step of receiving a request for at least one service. Here, the wired/wireless network may support a connection method using at least one of wired communication through a USB cable or wireless near-field communication including Bluetooth, ZigBee, Wi-Fi, etc. Furthermore, the multimedia device configured for a vehicle may also be interlocked with an IoT device which is located at a remote location using a mobile communication network.

Figure 3:
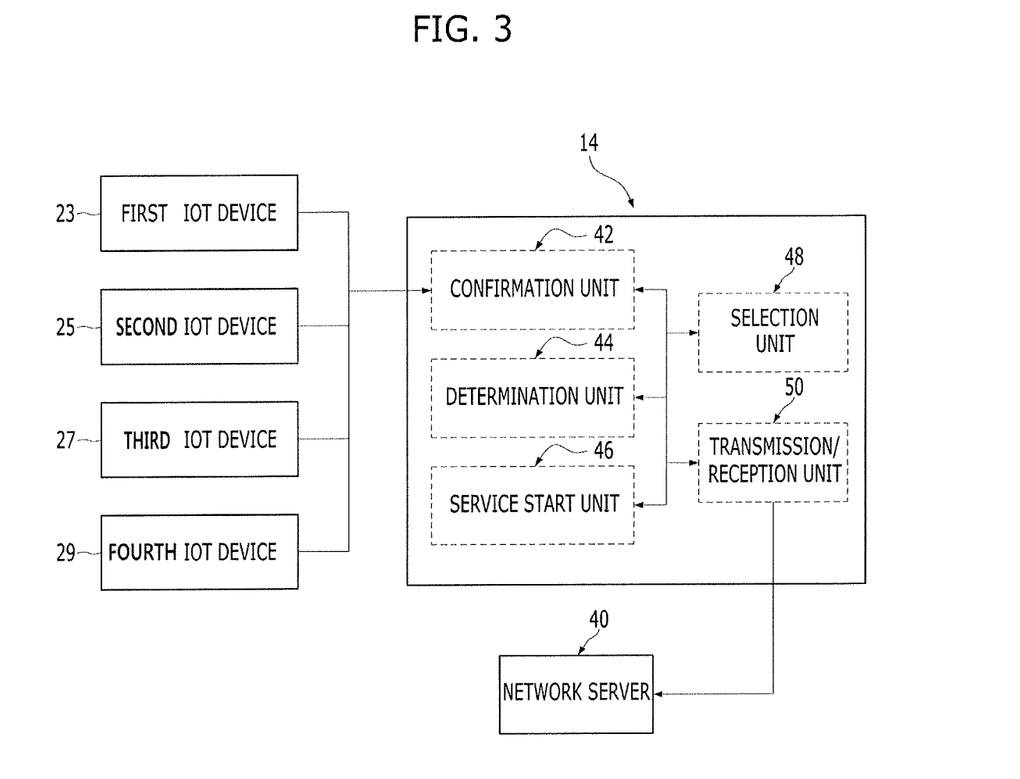
FIG. 3 is a view showing the multimedia device configured for a vehicle.

FIG. 3 is a view showing the multimedia device configured for a vehicle.

As illustrated, the multimedia device 14 for a vehicle may be interlocked with a plurality of IoT devices 23, 25, 27 and 29. The IoT devices may include a first IoT device 23, a second IoT device 25, a third IoT device 27, and a fourth IoT device 29. Here, the first IoT device 23, the second IoT device 25, the third IoT device 27 and the fourth IoT device 29 may be disposed at different positions from one another, and may have different operation methods, product types and frequencies of use from one another. Furthermore, the first IoT device 23, the second IoT device 25, the third IoT device 27 and the fourth IoT device 29 may output different data and information from one another, and may also commonly collect some data and information and may transmit the same to the multimedia device 14 for a vehicle.

The multimedia device 14 for a vehicle may include a confirmation unit 42, which confirms first classification information related to the IoT devices 23, 25, 27 and 29 and second classification information related to at least one service which may be provided using the IoT devices 23, 25, 27 and 29, a determination unit 44, which determines the reliability of the IoT devices 23, 25, 27 and 29 corresponding to the first classification information and the second classification information, and a selection unit 48, which selects a value transmitted from the IoT device which is selected corresponding to the reliability when data of the same item are transmitted redundantly from the IoT devices 23, 25, 27 and 29.

In the case in which the IoT devices 23, 25, 27 and 29, with which the confirmation unit 42 included in the multimedia device 14 for a vehicle is interlocked, include a wearable device, the first classification information may include a wearing position, a wearing type, a product type, and a frequency of use. For example, in the case in which the confirmation unit 42 receives biometric information related to a driver or a passenger in the vehicle from the wearable device, at least one service may be related to the health or driving safety of the driver or the passenger in the vehicle.

In the case in which the IoT devices 23, 25, 27 and 29, with which the confirmation unit 42 is interlocked, include a portable terminal, the confirmation unit 42 may receive location information from the portable terminal. At least one service may be performed to provide predetermined information to a driver or a passenger in the vehicle based on the location information.

The second classification information related to the service which is provided through the multimedia device configured for a vehicle may correspond to the kind of data required for performance of at least one service. For example, the second classification information may be classified according to biometric information, location information, or traveling state information related to the vehicle. Depending on the embodiment, the second classification information may vary depending on the IoT device which is controlled according to the service which is provided through the multimedia device configured for a vehicle.

The selection unit 48 included in the multimedia device 14 for a vehicle may detect at least one item of the data demanded by at least one service. The selection unit 48 may perform the first step of matching information collected from the first IoT device having the highest reliability for the at least one item and the second step of, in the case in which data that are matched for the item are absent, matching information collected from the second IoT device having the second-highest reliability, next to the first IoT device, for the corresponding item. Here, the second step may be repeated until all data are collected.

Furthermore, the multimedia device 14 for a vehicle may determine the presence or absence of error in the data and information received from the IoT devices 23, 25, 27 and 29 that are interlocked therewith. In more detail, the selection unit 48 may determine whether there is an error in the information collected from the most reliable IoT device among the IoT devices 23, 25, 27 and 29. In the case in which the information collected from the IoT device exceeds the critical range of the inherent value of the corresponding information, the present information is unreliable. Furthermore, the selection unit 48 may compare the similarity of the information collected from the most reliable IoT device with the information collected from the other IoT devices, among the IoT devices 23, 25, 27 and 29. In the case in which the difference between the information collected from the most reliable IoT device and the information collected from the other IoT devices exceeds a predetermined range, the selection unit 48 may doubt the reliability of the information received from the most reliable IoT device.

The selection unit 48 may select the most reliable IoT device or the second-most reliable IoT device corresponding to the result of the reliability determination by the determination unit 44. Furthermore, the selection unit 48 may adjust the reliability of the IoT devices corresponding to the presence or absence of error and the similarity based on the result of determining the reliability of data and information using the determination unit 44.

Although not illustrated, the multimedia device 14 for a vehicle may further include an interface for receiving a request for at least one service or displaying a result thereon. The multimedia device 14 for a vehicle may receive information related to the service requested by a driver or a passenger in the vehicle through an interface such as, for example, a microphone or a button. Furthermore, the multimedia device 14 for a vehicle may provide the service result to a driver or a passenger in the vehicle through an interface such as, for example, a speaker or a screen.

The multimedia device 14 for a vehicle may include a service start unit 46 for performing at least one service using the value selected by the selection unit 48. In the case in which the service which may be performed by the multimedia device 14 for a vehicle is requested by a driver or a passenger, the multimedia device 14 for a vehicle may start the corresponding service using information which may be collected.

In some cases, it may be difficult for the multimedia device 14 for a vehicle to perform the service which is requested therethrough. For the present reason, the multimedia device 14 for a vehicle may include a transmission/reception unit 50, which transmits the value selected by the selection unit 48 to a device (e.g., a network server 40) performing at least one service and receives a result related to the performance of the service.

The multimedia device 14 for a vehicle may be connected to the IoT devices 23, 25, 27 and 29 through a wired/wireless network. For example, the wired/wireless network may support a connection method using at least one of wired communication through a USB cable or wireless near-field communication including Bluetooth, ZigBee, Wi-Fi, etc. Furthermore, the multimedia device 14 for a vehicle may also be connected to an IoT device which is located at a remote location from the vehicle using a mobile communication network.

The confirmation unit 42, the determination unit 44 and the selection unit 48, which are included in the multimedia device 14 for a vehicle, may be implemented as a processing system and a computing device, including at least one processor and at least one memory. Furthermore, the processing system in the multimedia device 14 for a vehicle may further perform at least one of an audio function, a video function or a navigation function.

The confirmation unit 42 in the multimedia device 14 for a vehicle may be a module that receives information related to the IoT devices 23, 25, 27 and 29 and classifies the same. For example, the classification information received by the confirmation unit 42 may be a wearing position, a wearing type, a product type, a frequency of use, etc.

The service start unit 46 in the multimedia device 14 for a vehicle may receive information and may perform a service. The classification information related to the service performed by the service start unit 46 may be transmitted to the confirmation unit 42. The classification information related to a service may vary depending on the kind of service and data necessary for the service.

The determination unit 44 and the selection unit 48 in the multimedia device 14 for a vehicle may respectively determine and select data received thereby. Based on the classification information received through the confirmation unit 42, the multimedia device 14 for a vehicle determines the IoT device that outputs information which may be used or transmitted by the multimedia device.

Figure 4:
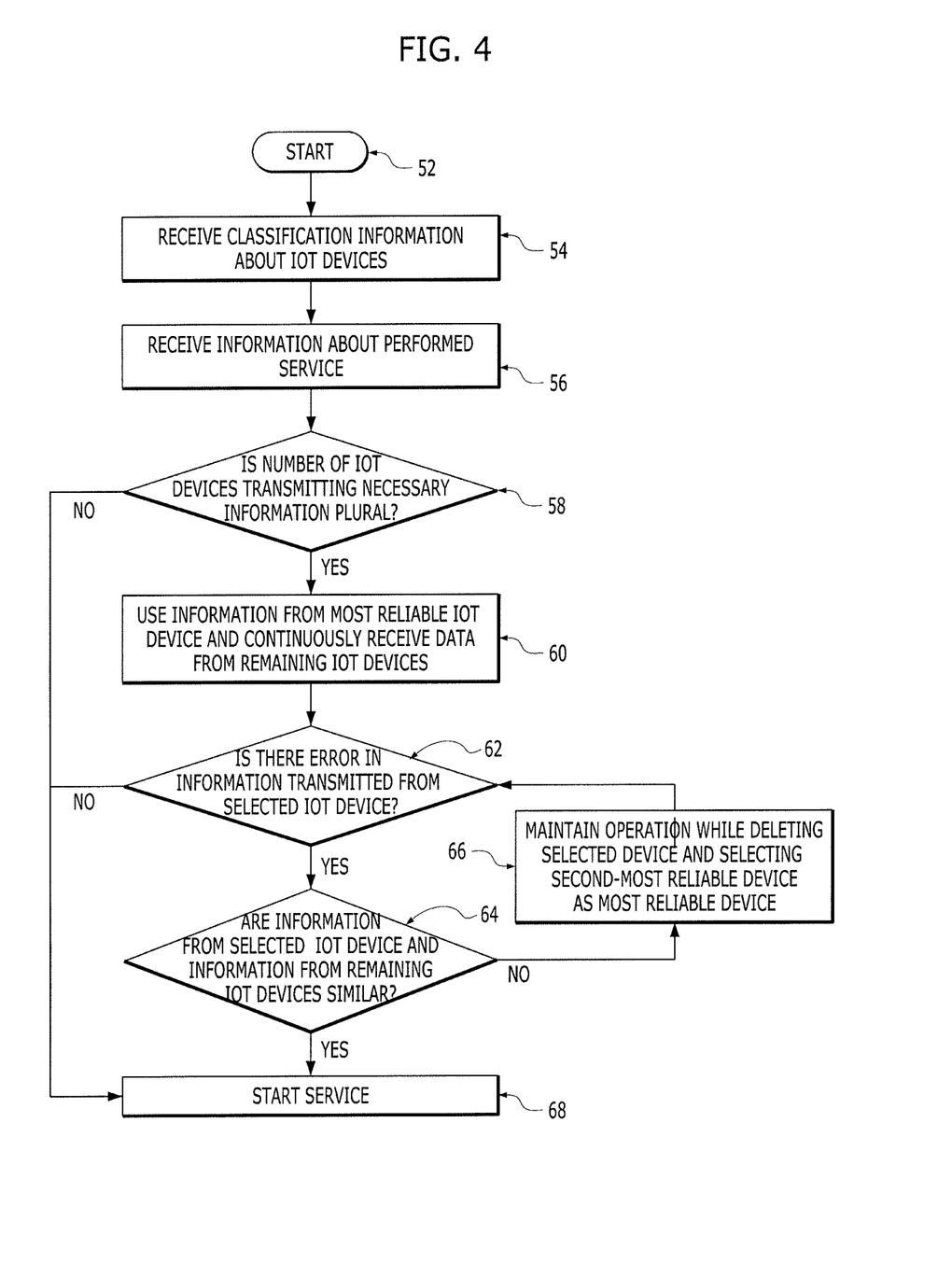
FIG. 4 is a view showing a second example of the method of controlling the multimedia device configured for a vehicle.

FIG. 4 is a view showing a second example of the method of controlling the multimedia device configured for a vehicle.

As illustrated, there may be provided a plurality of IoT devices that transmit information demanded by the multimedia device configured for a vehicle at step 52. In the instant case, it is required to select and classify information transmitted from the plurality of IoT devices.

First, the classification information related to the IoT devices may be received (54). Furthermore, information related to a service which is performed based on the data and information transmitted from the IoT devices may be received at step 56. Subsequently, a determination may be made of as to whether the number of IoT devices that transmit information required for performance of the service is plural at step 58.

In the case in which the number of IoT devices that transmit necessary information is not plural, a service may be started based on the transmitted data at step 68.

On the other hand, in the case in which the number of IoT devices that transmit necessary information is plural, the reliability of the IoT devices may be determined (e.g., among Dev0, Dev1, Dev2, . . . , and Devn, Dev0 may be determined to have the highest reliability, and Devn may be determined to have the lowest reliability) based on the classification information related to the IoT devices and information related to the service which is performed, and the information transmitted from the most reliable IoT device may be preferentially used at step 60. At the instant time, even when data transmitted from the most reliable IoT device are preferentially used, data transmitted from the other IoT devices are not removed, or reception thereof is not interrupted at step 60.

A determination may be made as to whether there is an error in the data and information transmitted from the most reliable IoT device. When it is determined that there is no error, a service may be started using the corresponding data at step 68.

On the other hand, when it is determined that there is an error, a determination may be made as to whether the data transmitted from the most reliable IoT device and the data transmitted from the other IoT devices are similar to each other at step 64. When it is determined that the data transmitted from the most reliable IoT device and the data transmitted from the other IoT devices are similar to each other, it may be determined that there is no problem in the data transmitted from the most reliable IoT device, and the service corresponding thereto may be started at step 68.

When it is determined that the data transmitted from the most reliable IoT device and the data transmitted from the other IoT devices are not similar to each other, it may be estimated that there is a problem in the data transmitted from the most reliable IoT device. In the instant case, the second-most reliable IoT device may be selected at step 66.

In the method of determining the reliability by the multimedia device configured for a vehicle, the reliability values may have been defined and stored in advance according to classification information related to the IoT devices and data that the IoT devices can output. Here, the reliability may be changed to be suitable for a user's preferences or lifestyle.

Furthermore, the multimedia device configured for a vehicle may also download the reliability data from a server connected through a network.

In the method of detecting the occurrence of an error (doubting the reliability) in the received information, the multimedia device configured for a vehicle may perform determination while dividing the criterion, on which the reliability of the received information value is determined, into a 95% confidence interval, a 99% confidence interval, or the like. The range of the confidence interval may be defined by a separate parameter according to the kind of service to be performed.

To determine the data similarity, the multimedia device configured for a vehicle may continuously maintain connection with the less reliable IoT devices, which are not being used for the currently provided service, may receive data therefrom, and may analyze the pattern of the data. In the case in which the reliability of the data, transmitted from the IoT device which is being used for the currently provided service, is doubted, a determination may be made as to the data similarity through data correlation between the IoT device which is being used for the service and the IoT devices that are not being used for the service.

Depending on the embodiment, in the case in which the number of devices transmitting necessary information is plural, the reliability of the IoT devices may be determined on the basis of the classification information thereof, and the IoT devices may be designated as Dev0, Dev1, Dev2, . . . , and Devn in order of highest to lowest reliability. In the case in which an emergency SOS service using a heart rate is being performed, the IoT devices that can transmit heart rate information may be a watch-type device (Dev0), a jacket-type device (Dev1), a glasses-type device (Dev2), etc. For example, the service may be performed using the heart rate information transmitted from the watch-type device, which is the most reliable. However, the multimedia device configured for a vehicle may maintain connection with the jacket-type and glasses-type devices to continuously receive heart rate information from the jacket-type and glasses-type devices, and may accumulate the data. At the instant time, in the case in which the reliability of the heart rate information received from the watch-type device is doubted due to the occurrence of an error, the data transmitted from the watch-type device and the cumulative data transmitted from the remaining devices, namely the jacket-type device and the glasses-type device, may be compared with each other through correlation analysis. When the correlation coefficient is equal to or greater than a predetermined value, it is determined that there is similarity, and the emergency SOS service is started, minimizing the incidence of errors in providing the service. The correlation coefficient may be defined by a separate parameter according to the characteristics of every service. In the case of an important service, in which minimization of error is required, the correlation coefficient may be set to approximately 1. In the case of a general service, in which minimization of error is relatively unimportant, the correlation coefficient may be set to approximately 0.8 on average. That is, the criteria on which the relationship and the similarity are determined may vary depending on services using the data and information transmitted from the IoT devices. In the case in which the data similarity is low, the watch-type device (Dev0) may be suspected of outputting erroneous data or malfunctioning, and thus the use of the watch-type device (Dev0) for the service may be prevented. Instead, less reliable devices may be used.

As described above, in the circumstance in which a plurality of IoT devices transmitting similar information is present as the IoT devices become popular, the above embodiment may provide a method of classifying and determining the priority of meaningless data and meaningful data. Furthermore, the exemplary embodiment is configured for determining whether there is an error in the data transmitted from the IoT devices, improving the accuracy of a service provided to a user.

A method according to the exemplary embodiment described above may be produced as a program which is executed in a computer, and may be stored in computer-readable recording media. Examples of the computer-readable recording media may include a ROM, a RAM, a CD-ROM, a magnetic tape, a floppy disk, an optical data storage system, etc.

The computer-readable recording media may be distributed in a computer system connected through a network, and computer-readable codes may be stored in a distributed manner and may be executed. Furthermore, a functional program, codes, and code segments for implementing the above-described method may be easily inferred by programmers skilled in the art to which the exemplary embodiment pertains.

As is apparent from the above description, an apparatus according to an exemplary embodiment of the present invention has the following effects.

The present invention may provide a method and an apparatus configured for classifying and determining the priority of meaningless data and meaningful data when a plurality of IoT devices is interlocked to transmit similar information.

Furthermore, the present invention is configured for efficiently managing energy which is consumed to confirm the location of a vehicle utilizing IoT devices.

Furthermore, the present invention is configured for selectively transmitting more accurate data for IoT services, reducing the frequency of occurrence of errors in provision of the services.

Furthermore, the present invention is configured for improving the accuracy of IoT services, increasing satisfaction and preference of a user, a driver and a passenger, with respect to a vehicle.

It will be appreciated by those skilled in the art that the effects achievable through the present invention are not limited to those that have been described hereinabove, and other effects of the present invention will be more clearly understood from the above detailed description.

Those skilled in the art will appreciate that the present invention may be conducted in other specific ways than those set forth herein without departing from the spirit and essential characteristics of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a multimedia device for a vehicle, the method comprising:
    confirming first classification information related to a plurality of Internet-of-Things (IoT) devices;
    confirming second classification information related to at least one service to be provided using the plurality of IoT devices;
    determining reliability of the plurality of IoT devices corresponding to the first classification information and the second classification information;
    when data of a same item are transmitted redundantly from the plurality of IoT devices, selecting a value transmitted from an IoT device selected corresponding to the reliability; and
    transmitting the selected value to a device that performs the at least one service,
    wherein the selecting of the value transmitted from the IoT device selected corresponding to the reliability includes:
        determining when there is an error in information collected from a first IoT device, the first IoT device being most reliable among the plurality of IoT devices;
        comparing similarity between the information collected from the first IoT device and information collected from remaining IoT devices, among the plurality of IoT devices; and
        adjusting the reliability of the first IoT device based on presence or absence of the error and the similarity.

2. The method according to claim 1,
    wherein the plurality of IoT devices includes a wearable device, and
    wherein the first classification information includes a wearing position, a wearing type, a product type, and a frequency of use.

3. The method according to claim 2,
    wherein the wearable device outputs biometric information related to a driver or a passenger in the vehicle, and
    wherein the at least one service is related to health or driving safety of the driver or the passenger in the vehicle.

4. The method according to claim 2,
    wherein the plurality of IoT devices includes a portable terminal,
    wherein the portable terminal outputs location information, and
    wherein the at least one service is configured to provide predetermined information to a driver or a passenger in the vehicle based on the location information of the portable terminal.

5. The method according to claim 1, wherein the second classification information corresponds to a kind of data that are required for performance of the at least one service.

6. The method according to claim 5, wherein the second classification information is classified according to one of biometric information, location information, and traveling state information related to the vehicle.

7. The method according to claim 6, wherein the selecting of the value transmitted from the IoT device selected corresponding to the reliability includes:
    detecting at least one item of data demanded by the at least one service;
    primarily matching information collected from the first IoT device configured for the at least one item, the first IoT device being most reliable; and
    when data that are matched for the at least one item are absent, secondarily matching information collected from a second IoT device configured for the at least one item, the second IoT device being second-most reliable, next to the first IoT device,
    wherein the secondarily matching is repeated until all of the data are collected.

8. The method according to claim 1, wherein the presence or the absence of the error is determined based on when the information exceeds a predetermined critical range.

9. The method according to claim 1, further including:
    performing connection with the plurality of IoT devices through a wired/wireless network; and
    receiving a request for the at least one service.

10. A multimedia device for a vehicle, the multimedia device comprising:
    a processor; and
    a memory storing computer-readable instructions executed by the processor, to perform operations comprising:
    confirming first classification information related to a plurality of Internet-of-Things (IoT) devices and second classification information related to at least one service to be provided using the plurality of IoT devices;
    determining reliability of the plurality of IoT devices corresponding to the first classification information and the second classification information;
    selecting a value transmitted from an IoT device which is selected corresponding to the reliability when data of a same item are transmitted redundantly from the plurality of IoT devices,
    determining when there is an error in information collected from a first IoT device, the first IoT device being most reliable among the plurality of IoT devices;
    comparing similarity between the information collected from the first IoT device and information collected from remaining IoT devices, among the plurality of IoT devices; and
    adjusting the reliability of the first IoT device based on presence or absence of the error and the similarity.

11. The multimedia device according to claim 10, wherein the processor further performs operations including:
    interlocking with a wearable device as one of the plurality of IoT devices,
    wherein the first classification information includes a wearing position, a wearing type, a product type, and a frequency of use.

12. The multimedia device according to claim 11, wherein the processor further performs operations including:
    receiving biometric information related to a driver or a passenger in the vehicle from the wearable device,
    wherein the at least one service is related to health or driving safety of the driver or the passenger in the vehicle.

13. The multimedia device according to claim 11, wherein the processor further performs operations including:
    interlocking with a portable terminal as one of the plurality of IoT devices, receiving location information from the portable terminal, and providing predetermined information to a driver or a passenger in the vehicle based on the location information.

14. The multimedia device according to claim 10, wherein the second classification information corresponds to a kind of data that are required for performance of the at least one service.

15. The multimedia device according to claim 14, wherein the second classification information is classified according to one of biometric information, location information, and traveling state information related to the vehicle.

16. The multimedia device according to claim 15, wherein the processor further performs operations including:
    detecting at least one item of data demanded by the at least one service;
    primarily matching information collected from the first IoT device configured for the at least one item, the first IoT device being most reliable; and
    when data that are matched for the at least one item are absent, secondarily matching information collected from a second IoT device configured for the at least one item, the second IoT device being second-most reliable, next to the first IoT device,
    wherein the secondarily matching is repeated until all of the data are collected.

17. The multimedia device according to claim 10, wherein the presence or the absence of the error is determined based on when the information exceeds a predetermined critical range.

18. The multimedia device according to claim 10, wherein the processor further performs operations including:
    performing the at least one service using a selected value; or
    transmitting the selected value to a device performing the at least one service and for receiving a result related thereto.

* * * * *